United States Patent
Kale et al.

(10) Patent No.: US 12,541,402 B2
(45) Date of Patent: Feb. 3, 2026

(54) MACHINE LEARNING MODEL LAYER

(71) Applicant: salesforce.com, inc., San Francisco, CA (US)

(72) Inventors: Arpeet Kale, Sunnyvale, CA (US); Shashank Harinath, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 950 days.

(21) Appl. No.: 17/659,775

(22) Filed: Apr. 19, 2022

(65) Prior Publication Data

US 2023/0333901 A1  Oct. 19, 2023

(51) Int. Cl.
  *G06F 9/50* (2006.01)
  *G06N 20/00* (2019.01)
(52) U.S. Cl.
  CPC .......... *G06F 9/5044* (2013.01); *G06F 9/5055* (2013.01); *G06N 20/00* (2019.01)
(58) Field of Classification Search
  None
  See application file for complete search history.

(56) References Cited

U.S. PATENT DOCUMENTS

| | | | |
|---|---|---|---|
| 10,713,594 B2 | 7/2020 | Szeto et al. | |
| 11,182,691 B1* | 11/2021 | Zhang | G06N 20/20 |
| 11,614,932 B2* | 3/2023 | Gumashta | G06F 8/71 |
| | | | 717/170 |
| 11,720,813 B2* | 8/2023 | Babu | G06N 20/20 |
| | | | 706/12 |
| 12,099,904 B2* | 9/2024 | Cao | G06N 5/04 |
| 2017/0286864 A1* | 10/2017 | Fiedel | G06F 9/546 |
| 2019/0102700 A1 | 4/2019 | Babu et al. | |
| 2019/0188605 A1* | 6/2019 | Zavesky | G06N 20/00 |
| 2020/0004596 A1* | 1/2020 | Sengupta | G06N 5/04 |
| 2020/0019882 A1 | 1/2020 | Garg et al. | |
| 2020/0110619 A1* | 4/2020 | Rajaram | G06N 20/00 |

(Continued)

OTHER PUBLICATIONS

Hunt et al.; "Chiron: Privacy-preserving Machine Learning as a Service"; arXiv:1803.05961v1 [cs.CR] Mar. 15, 2018; (Hunt_2018.pdf; pp. 1-15) (Year: 2018).*

(Continued)

*Primary Examiner* — Hiren P Patel
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to facilitating the execution of machine learning (ML) models. A computer system may implement an ML model layer that permits ML models built using any of a plurality of different ML model frameworks to be submitted without a submitting entity having to define execution logic for a submitted ML model. The computer system may receive, via the ML model layer, configuration metadata for a particular ML model. The computer system may then receive a prediction request from a user to produce a prediction based on the particular ML model. The computer system may produce a prediction based on the particular ML model. As a part of producing that prediction, the computer system may select, in accordance with the received configuration metadata, one of a plurality of types of hardware resources on which to load the particular ML model.

18 Claims, 7 Drawing Sheets

(56) References Cited

U.S. PATENT DOCUMENTS

| | | | | |
|---|---|---|---|---|
| 2020/0356415 | A1* | 11/2020 | Goli | G06N 20/00 |
| 2020/0380415 | A1* | 12/2020 | Siracusa | G06N 3/08 |
| 2021/0081819 | A1* | 3/2021 | Polleri | G06F 16/252 |
| 2021/0281662 | A1* | 9/2021 | Mathur | G06N 20/00 |
| 2022/0083389 | A1* | 3/2022 | Poothia | G06F 9/5027 |
| 2022/0092346 | A1* | 3/2022 | Jones | G06F 18/285 |
| 2022/0215008 | A1* | 7/2022 | Adibowo | G06F 12/0802 |
| 2022/0391748 | A1* | 12/2022 | Nikitin | G06F 9/45558 |

OTHER PUBLICATIONS

Vartak et al.; "MODELDB: Opportunities and Challenges in Managing Machine Learning Models"; Copyright 2018 IEEE; (Vartak_2018.pdf; pp. 16-25) (Year: 2018).*

Garcia et al.; "A Cloud-Based Framework for Machine Learning Workloads and Applications"; Special Section on Scalable Deep Learning for Big Data; IEEE 2020; DOI: 10.1109/ACCESS.2020.2964386; (Garcia_2019.pdf) (Year: 2020).*

Sigl et al.; "Don't Fear the Reaper: A Framework for Materializing and Reusing Deep-Learning Models"; 2019 IEEE 35th International Conference on Data Engineering (ICDE); DOI 10.1109/ICDE.2019.00246; (Sigl_2019.pdf) (Year: 2019).*

Tsay et al.; "AIMMX: Artificial Intelligence Model Metadata Extractor"; 2020 IEEE/ACM 17th International Conference on Mining Software Repositories (MSR); https://doi.org/10.1145/3379597.3387448; (Tsay_2020.pdf) (Year: 2020).*

* cited by examiner

MACHINE LEARNING MODEL LAYER

BACKGROUND

Technical Field

This disclosure relates generally to computer systems and, more specifically, to various mechanisms for facilitating the execution of machine learning models.

Description of the Related Art

Enterprises are shifting towards using machine learning models to solve problems in a variety of applications, such as decision support, recommendation generation, computer vision, speech recognition, medicine, etc. A machine learning model is generally trained to recognize certain types of patterns. A machine learning algorithm is used to train the model over a set of sample data (referred to as training data) so that it can learn from the patterns of that data. Once the model is trained, it can be used on a new dataset to make predictions based on its learning from previous dataset patterns. For example, a machine learning model that is trained using a set of images that include objects can be used to recognize and classify objects in a new set of images. It can be a complex process to develop machine learning models and thus a framework, such as a tool or an interface, is often used to develop those models. Examples of frameworks include TensorFlow, PyTorch, and scikit-learn.

DETAILED DESCRIPTION

Figure 1:
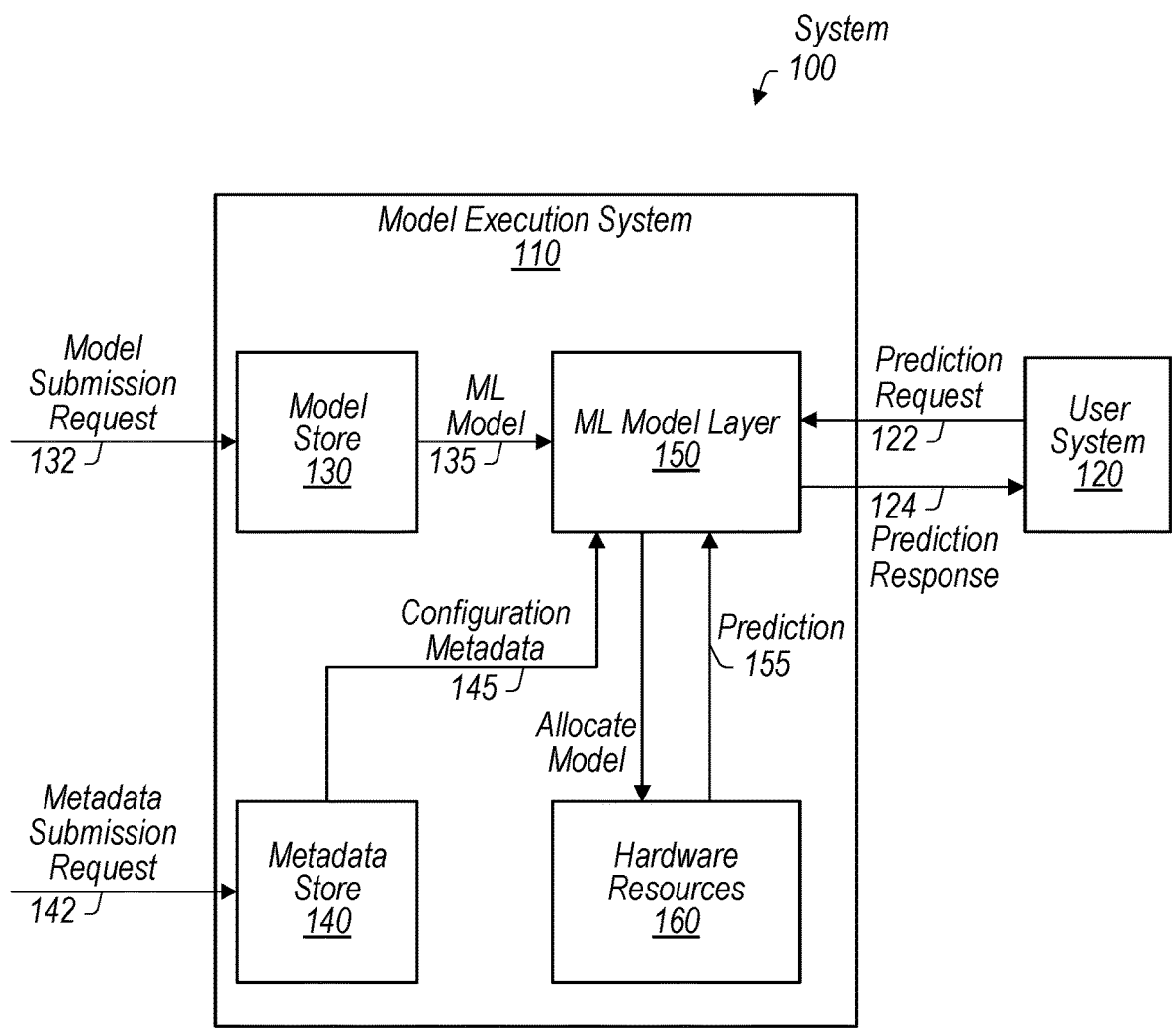
FIG. 1 is a block diagram illustrating example elements of a system that includes a user system and a model execution system having a machine learning model layer, according to some embodiments.

Machine learning models are more commonly being used to tackle different use cases faced by data scientists. Taking a machine learning use case to production (with the intention of providing certain capabilities to users) often involves data scientists having to author model training and model scoring code. Onboarding that code to a production infrastructure involves significant effort. As an example, it can involve writing an application programming interface (API) for feeding requests to the model execution logic. This effort is common across different machine learning uses cases and can be per use case as every use case can be different and thus involve developing different algorithms to address those use cases. Moreover, there are many steps involved in writing and running an algorithm in production and data scientists might not possess the skill set for handling those steps. Yet, another problem is that data scientists do not often have the flexibility to use the framework of their choice as some frameworks have better APIs to solve certain use cases, and some do not, which might affect the accuracy of the model and user experience. This disclosure addresses, among other issues, the technical problem of how to offload the effort of authoring model execution logic by data scientists and also provide efficient mechanisms for handling the allocation and deallocation of machine learning models from hardware resources.

The present disclosure describes techniques for implementing a machine learning (ML) model layer that permits ML models built using any of various different ML model frameworks (e.g., TensorFlow, PyTorch, etc.) to be submitted without the submitting entity having to define execution logic for a submitted ML model. In order to facilitate the execution of the submitted ML model, in various embodiments, that submitting entity defines and provides configuration metadata. The configuration metadata may identify the input and output expected by the model along with other information, such as which model platforms can utilize that ML model. The ML model may be stored at a model store while the configuration metadata may be stored at a metadata store. During operation, a computer system that implements the ML model layer may receive a prediction request from a user to produce a prediction based on that ML model. The computer system may access the ML model and the associated configuration metadata using a model ID specified in the prediction request. Based on that configuration metadata, in various embodiments, the computer system selects a type of hardware resource (e.g., central processing units (CPUs), graphics processing units (GPUs), etc.) on which to load the ML model and then loads the ML model on onto that selected type of hardware resource in accordance with model resource requirements of the ML model. The computer system may produce a prediction using the ML model and return the prediction to the user or another entity.

In some embodiments, the ML model layer batches multiple prediction requests at once such that multiple predictions are produced based on the same ML model at relatively the same time, thereby enabling multiple users to be served at the same time. The ML model layer may also implement memory management mechanisms, including maintaining a set of ML models in a memory of the computer system and swapping them with ML models already allocated on hardware resources. For example, upon approaching or reaching an available resource limit for a certain type of hardware resource, the ML model layer may load a requested ML model onto that type of hardware resource while removing the ML model that was least recently used. The ML model layer may further reuse the same ML model for prediction requests from different users without reloading the ML model for each request. Moreover, regardless of the framework that is used, in some embodiments, the ML model layer can convert an ML model into a format understood by GPUs to achieve a greater level of performance and to speed up the execution process.

These techniques may be advantageous as they offload the effort of authoring model execution logic by data scientists while also providing mechanisms for handling the allocation of ML models on hardware resources. As a result, data scientists are provided the flexibility to use the framework of their choice while not having to write model execution code, which may allow for them to invest that time in solving more problems and providing more AI capabilities to users, improving the user experience. These techniques may further provide high throughput at low latency within a multi-tenant environment by enabling multiple users to issue prediction requests against the same ML model at relatively the same time. Furthermore, the management of models in memory and their swapping on hardware resources may optimize cost by sharing resources across different ML models. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a model execution system 110 and a user system 120. As further shown, model execution system 110 includes a model store 130, a metadata store 140, an ML model layer 150, and a set of hardware resources 160. In some embodiments, system 100 is implemented differently than shown. For example, system 100 may include multiple model execution systems 110 that are in communication, model store 130 and metadata store 140 may be implemented as a single store, there may be more than one user system 120, model execution system 110 may interface with an application server, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores (e.g., model store 130 and metadata store 140), and other entities of system 100. In various embodiments, a portion (e.g., model execution system 110) of system 100 is implemented using a cloud infrastructure provided by a cloud provider. Model execution system 110 may thus utilize the available cloud resources of that infrastructure (e.g., computing resources, storage resources, etc.) to facilitate its operation. As an example, ML model layer 150 might execute in a virtual environment that is hosted on server-based hardware included in a datacenter of the cloud provider. But in some embodiments, system 100 is implemented utilizing a local or private infrastructure as opposed to a public cloud. As illustrated, system 100 includes model execution system 110 that receives prediction requests 122 and provides prediction responses 124 to requestors that are associated with system 100.

Model execution system 110, in various embodiments, is hardware or a combination of hardware and software capable of providing prediction services that facilitate machine learning model execution for providing predictions 155. These prediction services may be provided to components residing within system 100 or to components external to system 100. As depicted, for example, model execution system 110 receives a prediction request 122 from user system 120 operated by a user associated with system 100. As another example, that prediction request 122 may be received from an application server or a database server that is executing on system 100. A prediction request 122, in various embodiments, is a request for one or more predictions 155 to be produced using a particular model 135 and particular input. For example, a prediction request 122 may specify a set of emails to be classified based on a model 135 trained to classify emails based on their content. Accordingly, in various embodiments, a prediction request 122 specifies parameters for facilitating model execution to produce predictions 155—e.g., a model ID for accessing a model 135 from model store 130.

Model store 130, in various embodiments, is a storage repository for storing ML models 135 that can be used to service prediction requests 122. Model store 130 may implement a set of mechanisms that enable it to provide scalability, data availability, security, and performance, making it suitable to store and protect ML models 135. In various embodiments, model store 130 is implemented using a single or multiple storage devices that are connected together on a network (e.g., a storage attached network (SAN)) and configured to redundantly store data in order to prevent data loss. The storage devices may store data persistently and thus model store 130 may serve as a persistent storage for system 100. Model store 130 may include supporting software (e.g., storage servers) that allows ML model layer 150 to access ML models 135 from model store 130. While model store 130 is shown residing in model execution system 110, in various embodiments, model store 130 is external to model execution system 110 and operated by a different entity. As an example, model store 130 might be implemented using an Amazon Web Service (AWS) s3 bucket.

As illustrated, model store 130 can receive a model submission request 132. The model submission request 132 may be received from a user of system 100 (e.g., a data scientist) and include trained ML models 135 authored by that user using a framework of their choice. These trained ML models 135 may be used to solve a variety of use cases by producing predictions 155 for prediction requests 122 that are received from user system 120. In some embodiments, upon receiving a model submission request 132, model store 130 stores the ML models 135 of that request as a set of ML model artifacts in its storage repository, in a manner that allows the ML models 135 to be readily downloaded by ML model layer 150 for prediction purposes. In the context of multi-tenancy, model store 130 may store ML models 135 that are received from different tenants (e.g., users, companies, etc.) of system 100 such that an ML model 135 stored by one tenant is accessible and usable by another tenant. In other embodiments, an ML model 135 stored by one tenant is not accessible by another tenant.

Metadata store 140, in various embodiments, is a storage repository for storing model metadata for ML models 135. As shown, metadata store 140 can receive a metadata submission request 142. The metadata submission request 142 may be received from a user of system 100 (e.g., the data scientist that provided the corresponding ML model 135) and include a metadata file that has configuration metadata 145 for the corresponding ML model 135 stored in model store 130. Configuration metadata 145, in various embodiments, defines a set of properties for facilitating the execution of an ML model 135. For example, configuration metadata 145 may specify the type(s) of input that can be provided to the ML model 135 and the type(s) of output produced by that ML model or expected to be returned to the user. Configuration metadata 145 may specify the same or different sets of properties for different ML models 135 that are stored at model store 130—the properties specified for an ML model may be based on the use case of that ML model 135. An example of configuration metadata 145 is described in more detail with respect to FIG. 2.

ML model layer 150, in various embodiments, facilitates the execution of an ML model 135 in order to service prediction requests 122 from user system 120. Accordingly, in response to receiving a prediction request 122 for a prediction 155 based on a particular ML model 135, ML model layer 150 may access that ML model 135 from model store 130 and its configuration metadata 145 from metadata store 140. In some embodiments, the configuration metadata 145 includes information for accessing the corresponding ML model 135 and thus ML model layer 150 may access the configuration metadata 145 before the ML model 135. Once the ML model 135 and the configuration metadata 145 have been accessed, ML model layer 150 may allocate the ML model 135 onto hardware resources 160 in accordance with the configuration metadata 145. As discussed in more detail with respect to FIG. 4, ML model layer 150 may swap an ML model 135 for an already allocated ML model 135 according to an eviction scheme. After that ML model 135 has been allocated, ML model layer 150 may pass in input values and receive a set of predictions 155 in response. A prediction 155 may be a classification of the input values along with an indication of the confidence in that classification. As an example, an ML model 135 trained to detect spam emails may be used to produce a prediction 155 that a certain input email is spam with a high certainty. Predictions 155 may be forwarded to user system 120 via a prediction response 124. ML model layer 150 may therefore serve as a model management service that enables ML models 135 to be executed in order to produce predictions 155.

Hardware resources 160, in various embodiments, are physical or virtual components of limited availability within system 100. Examples of hardware resources 160 include, but are not limited to, central processing units (CPUs), graphics processing units (GPUs), application specific integrated units, field programmable gate array units, and virtual machines. Hardware resources 160, in some embodiments, are resources of a public cloud accessible to system 100 and might be used in parallel to increase the throughput of data and the number of calculations performed within a period of time. As shown, ML models 135 can be allocated onto hardware resources 160 and used to produce predictions 155. As discussed in greater detail with respect to FIG. 3, framework specific adapters and execution engines (e.g., Triton) may be executed on hardware resources 160 to enable the loading and use of ML models 135. Hardware resources 160 may also provide extensibility by providing the ability to add custom adapters.

Figure 2:
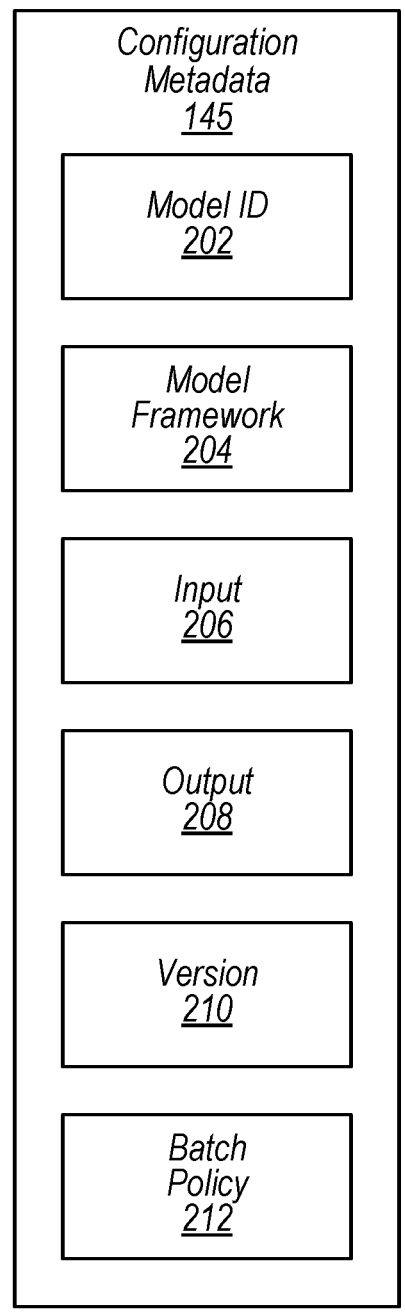
FIG. 2 is a block diagram illustrating example elements of configuration metadata that facilitates model execution, according to some embodiments.

Turning now to FIG. 2, a block diagram of example configuration metadata 145 that can be used to facilitate the execution of an ML model 135 is shown. In the illustrated embodiment, configuration metadata 145 identifies a model ID 202, a model framework 204, an input 206, an output 208, a version 210, and a batch policy 212. In various embodiments, configuration metadata 145 may identify additional parameters, options, and preferences that can be used to facilitate the execution of an ML model 135. As an example, configuration metadata 145 may identify whether an ML model 135 can be shared among tenants or is reserved to a specific set of tenants (e.g., the tenant who provided the corresponding ML model 135).

Model ID 202, in various embodiments, is an identifier that can be used to identify and access an ML model 135. Model ID 202 might be a sequence of numbers or an alphanumeric string and may be defined in the model submission request 132 that included the corresponding ML model 135. In some cases, model execution system 110 creates model ID 202 in response to receiving the model submission request 132 and includes it in configuration metadata 145. In some embodiments, model ID 202 includes a URL that identifies a location (e.g., an address at model store 130) where the corresponding ML model 135 is stored. Accordingly, in response to receiving a prediction request 122 from user system 120, ML model layer 150 may access model ID 202 based on that prediction request 122 and then use the URL portion of model ID 202 to access the requested ML model 135 from model store 130. In other embodiments, model ID 202 does not specify a URL; rather, ML model layer 150 obtains model ID 202 (e.g., via a prediction request 122) and uses model ID 202 to obtain the ML model 135 from model store 130 and configuration metadata 145 from metadata store 140 by issuing requests that include model ID 202.

Model framework 204, in various embodiments, identifies a framework that was used to develop the ML model 135 corresponding to configuration metadata 145. The selection of a model framework may be based on several factors, such as the programming language used, the requirements of the training phase, the artificial intelligence (AI) use case, the familiarity of the ML model developer(s) with a framework. Examples of model frameworks include, but are not limited to, TensorFlow, PyTorch, Sci-Kit Learn etc. In some embodiments, ML model layer 150 uses model framework 204 to determine onto which hardware resources 160 to load the corresponding ML model 135. For example, if an ML model 135 is created using a model framework designed for CPUs, then ML model layer 150 may load that ML model 135 onto a set of CPUs.

Input 206, in various embodiments, is a field defining properties of the input data (e.g., size and type of the data) that can be fed into an ML model 135. Various formats of input data 206 are possible. One example format may be comprised of various fields as follows: [<name>, <data_type>, <dimensions>]. The field <name> may identify a name of the input (e.g., "input-1"), the field <data_type> may identify a type of the data (e.g. int32, string, etc.), and the field <dims> may indicate the shape of the data (e.g., [128]). In various embodiments, configuration metadata 145 can specify multiple inputs 206 of the same or different input formats—e.g., one input 206 may involve integers and another input 206 involves strings. In some embodiments, multiple formats can be specified for the same input 206— e.g., an ML model 135 may accept a value as an int32 or an int64.

Output 208, in various embodiments, is a field that defines properties of the output data (e.g., size and type of the data) produced by an ML model 135—the output data can correspond to prediction(s) 155. Various formats of output data 208 are possible. One example format may be comprised of various fields as follows: [<name>, <data_type>, <dimensions>]. The field <name> may identify a name of the input (e.g., "output-1"), the field <data_type> may identify a type of the data (e.g. int32, string, floating point, etc.), and the field <dims> may indicate the shape of the data (e.g., [128, 17]). In various embodiments, configuration metadata 145 can specify multiple outputs 208 of the same or different output formats—e.g., one output 208 may involve integers while another output 208 involves strings. In some embodiments, multiple formats can be specified for the same output 208—e.g., an ML model 135 may produce a value as an int32 or an int64.

Version 210, in various embodiments, identifies the version of the ML model 135 that corresponds to configuration metadata 145. In some cases, ML models 135 are retrained using better algorithms in order to produce better predictions 155. When an ML model 135 is trained, its version may be updated as it may be considered a new version of the previously trained ML model 135. When the updated ML model 135 is stored, new configuration metadata 145 may be stored for that ML model 135. Accordingly, in various embodiments, version 210 indicates which model version of an ML model 135 that configuration metadata 145 is linked. Prediction requests 122 may specify a model ID 202 and a version 210 and thus ML model layer 150 may identify a set of configuration metadata files based on that model ID and select the file whose version 210 matches the provided model version.

Batch policy 212, in various embodiments, defines a set of preferred batch sizes, a max batch size, and/or a wait time for batch collection. As mentioned, batching may permit multiple prediction requests 122 to be serviced at a time and thus multiple users may be served. In some cases, multiple prediction requests 122 may be received from a single user. The set of preferred batch sizes, in various embodiments, are sizes (e.g., 4, 8, 16, 32, etc.) for which an ML model 135 is optimized to handle. Consequently, ML model layer 150 may attempt to batch requests at the preferred batch sizes if a sufficient number of prediction requests 122 have been received to satisfy one or more of the preferred batch sizes. The max batch size (e.g., 128) indicates the maximum number of requests that can be processed against an ML model 135 within a defined time interval. The wait time, in various embodiments, indicates amount of delay to be observed between batching requests to be processed against an ML model 135.

Configuration metadata 145, in some embodiments, specifies additional or other pieces of metadata that can facilitate the execution of an ML model 135. Configuration metadata 145 might specify hardware requirements (e.g., memory), network requirements (e.g., latency), and performance requirements (e.g., throughput) that ML model layer 150 attempts to provide for the execution of the ML model 135 associated with configuration metadata 145. For example, configuration metadata 145 may specify that at least four cores and 8 GB of memory should be utilized to execute the ML model 135.

Figure 3:
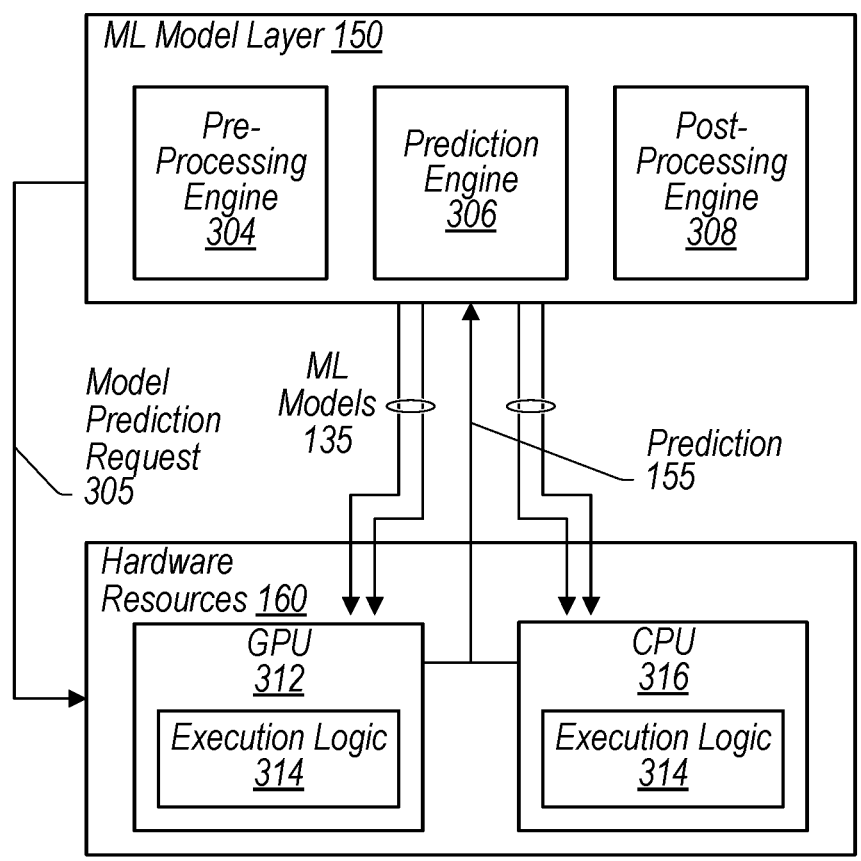
FIG. 3 is a block diagram illustrating example elements of the machine learning model layer allocating ML models onto hardware resources to produce predictions, according to some embodiments.

Turning now to FIG. 3, a block diagram of ML model layer 150 allocating a set of ML models 135 onto hardware resources 160 to produce predictions 155 is shown. In the illustrated embodiment, ML model layer 150 includes a pre-processing engine 304, a prediction engine 306, a post-processing engine 308, and hardware resources 160 having a GPU 312 and a CPU 316. Also as shown, GPU 312 and CPU 316 include respective execution logic 314. In some embodiments, ML model layer 150 or hardware resources 160 may be implemented differently than shown. For example, pre-processing engine 304 and post-processing engine 308 may be implemented separately from ML model layer 150 (e.g., a user pre-processes the input before providing it in a prediction request 122), there may be multiple GPUs 312 and/or CPUs 316, etc.

As discussed, ML model layer 150 may facilitate the execution of an ML model 135 to service prediction requests 122 from user system 120. As part of servicing a prediction request 122, in various embodiments, engines 304, 306, and 308 are executed in an order, starting with pre-processing engine 304 and ending with post-processing engine 308. In some cases, one or more of those engines 304, 306, and 308 are not executed. For example, a prediction 155 from an ML model 135 may not require further processing before being returned to a requestor and thus post-processing engine 308 may not be executed. As another example, input provided for generating a prediction 155 may not need to be converted into a format that can be used against an ML model 135 and thus pre-processing engine 308 may not be executed.

Pre-processing engine 304, in various embodiments, is software executable to receive input (e.g., in a prediction request 122 from user system 120) in a first format and convert that input into a second format that can be understood and used with the relevant ML model 135. For example, a prediction request 122 may identify an email whose content is in a text format, but the identified ML model 135 may utilize only integers. Accordingly, pre-processing engine 304 may convert the content into a set of integers. In various embodiments, a portion or all of the logic of pre-processing engine 304 may be onboarded by a graph execution service (GES) or by an application team or data scientists.

Prediction engine 306, in various embodiments, is software executable to facilitate the execution of ML models 135, including allocating the ML models 135 onto hardware resources 160 and supplying input data (e.g., received from pre-processing engine 304) for generating a set of predictions 155. In response to receiving input data from pre-processing engine 304 or in response to receiving a prediction request 122 at ML model layer 150, prediction engine 306 may access configuration metadata 145 pertinent to processing that prediction request 122. In some embodiments, prediction engine 306 accesses that configuration metadata 145 based on a model ID 202 specified in the prediction request 122. Based on that configuration metadata 145, prediction engine 306 may access the appropriate ML model 135 from model store 130 and prepare it for execution by loading it onto hardware resources 160. In some embodiments, prediction engine 306 selects the appropriate type of hardware resource 160 for that ML model 135 based on the configuration metadata 145. For example, prediction engine 306 may select hardware resources 160 (e.g., CPUs 316) that are optimized for the model framework 204 that is specified in the configuration metadata 145. That is, configuration metadata 145 may include information about the right execution engine that the ML model 135 can be loaded on to serve model prediction requests 305. Once prepared, the ML model 135 may then be loaded onto the selected hardware resource(s) 160.

Hardware resources 160, as shown, can include GPU(s) 312 and CPU(s) 316. GPU 312 and CPU 316 may be used to implement execution engines that include execution logic 314. Execution logic 314, in various embodiments, is hardware or software capable of utilizing ML models 135 to generate predictions 155. For example, execution logic 314 may correspond to Nvidia TensorRT®. In some embodiments, execution logic 314 includes a software tool that is run to convert ML models 135 into a supported native format. As an example, the software tool may correspond to Nvidia Triton™, which can be used to convert ML models 135 that are written using TensorFlow, PyTorch, or another framework into the TensorRT format. As such, in some cases, to load an ML model 135 onto hardware resources 160, prediction engine 306 issues a model prediction request 305 (which includes the ML model 135) to execution logic 314. Execution logic 314 may convert the ML model into a native format and then execute an ML algorithm in connection with a loaded ML model 135 to generate a set of predictions 155. Those predictions 155 may then be sent to ML model layer 150 as shown. The conversion of the ML model 135 into the native format may speed up the execution process, which in turn optimizes the performance.

Post-processing engine 308, in various embodiments, is software executable to obtain a prediction 155 and convert it into a format requested by user system 120. A portion or all of the logic of post-processing engine 308 may be onboarded by a graph execution service (GES), an application team, data scientists. Post-processing engine 308 may perform other operations than conversion. For example, in response to a certain prediction 155, post-processing engine 308 may access records from a storage repository that are relevant to that prediction 155 and return those records to the requestor (e.g., user system 120). After performing post-processing, post-processing engine 308 may provide, to user system 120, a prediction response 124 having the prediction(s) 155.

Figure 4:
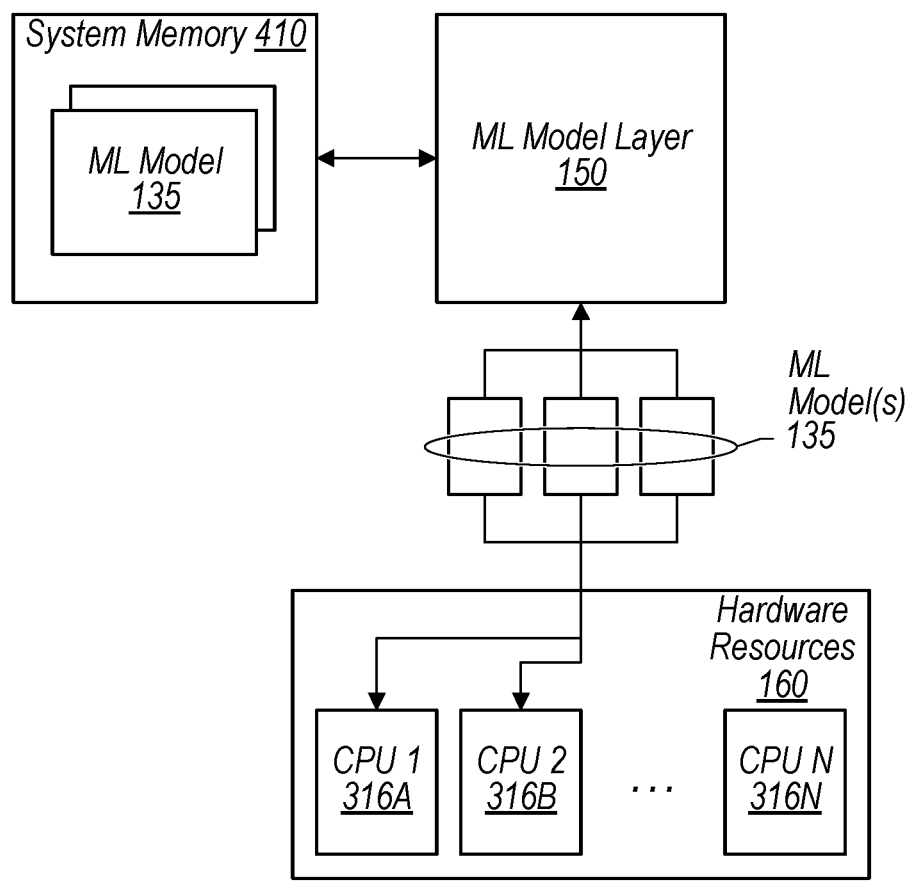
FIG. 4 is a block diagram illustrating example elements of the machine learning model layer loading and offloading multiple models to and from a system memory, according to some embodiments.

Turning now to FIG. 4, a block diagram of ML model layer 150 loading and offloading multiple ML models 135 onto hardware resources 160 is shown. In the illustrated embodiment, there is ML model layer 150, hardware resources 160, and a system memory 410 that includes ML models 135. While hardware resources 160 is shown as having CPUs 316A-N, in various embodiments, hardware resources 160 may include other hardware components, such as GPUs 312. The illustrated embodiment may be implemented differently than shown. As an example, ML models 135 may not be cached in a local system memory 410.

As explained, ML models 135 may be loaded onto hardware resources 160 and utilized by execution logic 314 to generate predictions 155. In order to improve the rate at which those predictions 155 are generated, in some embodiments, multiple instances of the same ML model 135 may be loaded onto hardware resources 160 at relatively the same time. In some cases, the instances of an ML model 135 are loaded across multiple instances of a single type of hardware resource 160 while, in other cases, onto one single instance of that hardware type. For example, two instances of an ML model 135 might be loaded onto CPUs 316A and 316B, but in another example, both instances may be loaded onto CPU 316A. In some embodiments, an ML model 135 is loaded onto different types of hardware resources 160. For example, instances of an ML model 135 might be loaded onto a GPU 312 and a CPU 316. In various embodiments, multiple, different ML models 135 share hardware resources 160 and thus may be loaded onto a single hardware resource 160 (e.g., CPU 316A). The selection of the right type of hardware resource 160 may be based on an ML model's configuration metadata 145 (e.g., it may specify the types of hardware resources 160 that can be used for the ML model 135). Loading multiple instances of ML models 135 may be useful in various systems, such as a multi-tenant system in which there may be multiple tenants issuing prediction requests 122. By loading multiple instances of one or more ML models 135 at relatively the same time, those prediction requests 122 may be served efficiently.

In some instances, the number of ML models 135 to be loaded exceeds the amount of hardware resources 160 that are available. Consequently, in various embodiments, ML model layer 150 swaps ML models 135 that are already loaded on hardware resources 160 with new ML models 135 in order to serve prediction requests 122. ML model layer 150 may evict those already loaded ML models 135 based on various eviction schemes. As an example, ML model layer 150 may evict the least recently used ML model(s) 135 from hardware resources 160 and store them at system memory 410. System memory 410, in various embodiments, is a memory device local to ML model layer 150 that can be used to store ML models 135—e.g., a memory of the computer system that implements ML model layer 150. In particular, to avoid the cost of redownloading ML models 135 from model store 130 (e.g., an AWS s3 bucket that is remote from ML model layer 150), ML model layer 150 may store previously accessed ML models 135 at system memory 410 (after initially accessing them from model store 130). Accordingly, ML models 135 that are often loaded and offloaded from hardware resources 160 may be efficiently swapped with other ML models 135 using system memory 410. That is, the flexibility of being able to store ML models 135 in system memory 410 and then access them from system memory 410 during model swaps may allow for faster prediction responses 124. Moreover, in various embodiments, prediction requests 122 received from different users may be served using the same ML model 135 without reloading/allocating that ML model 135 onto hardware resources 160. As a result, prediction requests 122 in a multi-tenant system may be processed more efficiently.

Figure 5:
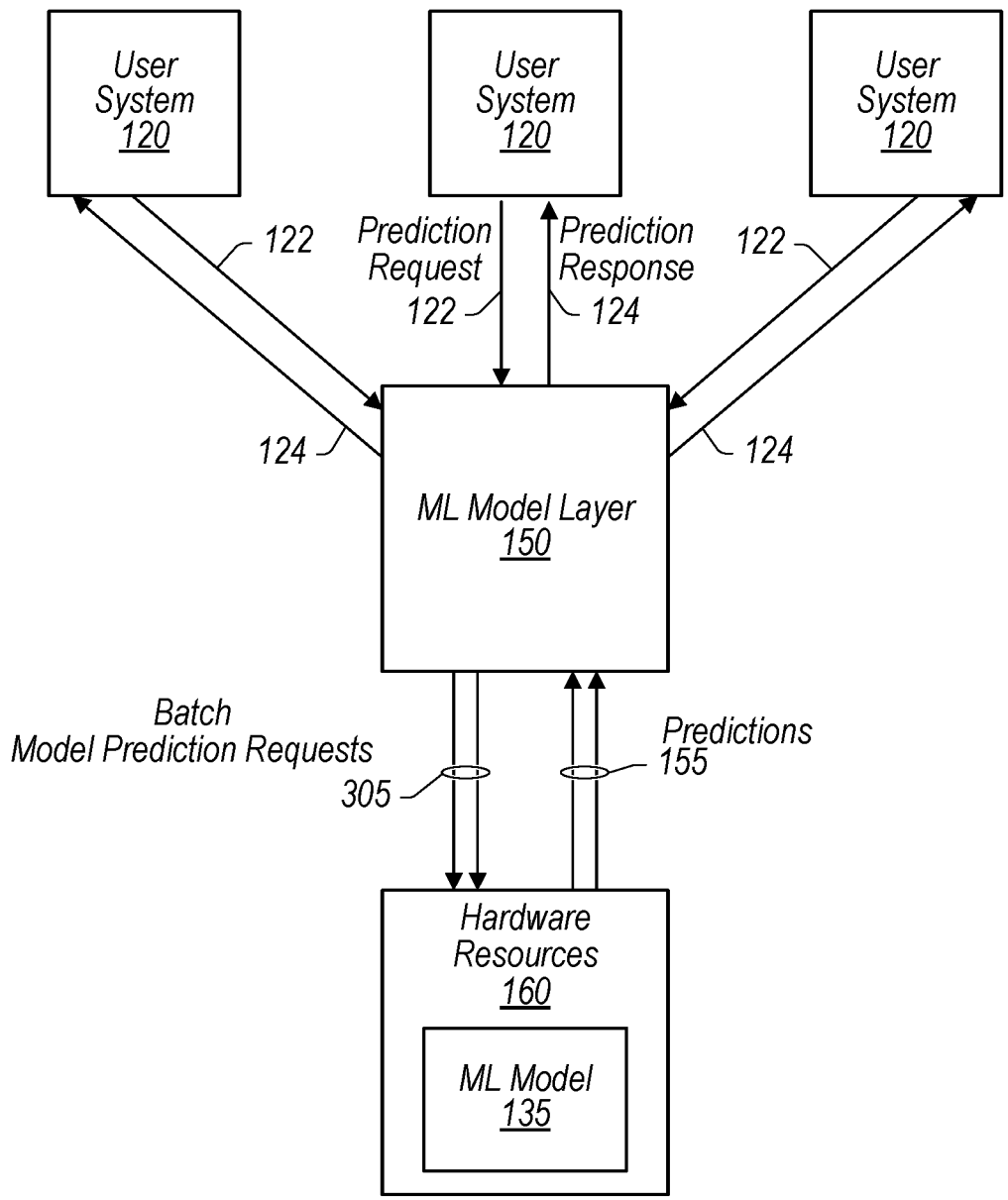
FIG. 5 is a block diagram illustrating example elements of the machine learning model layer batching multiple prediction requests, according to some embodiments

Turning now to FIG. 5, a block diagram of ML model layer 150 batching multiple model prediction requests 305 against an ML model 135 is depicted. In the illustrated embodiment, there are multiple user systems 120, ML model layer 150, and hardware resources 160 having a loaded ML model 135. The illustrated embodiment might be implemented differently than depicted. As an example, there may be multiple ML models 135 loaded on hardware resources 160.

As shown, ML model layer 150 can receive prediction requests 122 from multiple user systems 120. Multiple prediction requests 122 may be received from the same user system 120 or multiple user systems 120 at relatively the same time and be directed at the same ML model 135. Accordingly, ML model layer 150 may group them together and batch them together as a batch of model prediction requests 305. The number of model prediction requests 305 that are batched at a time may be based on the configuration metadata 145 (e.g., batch policy 212) of the corresponding ML model 135, as previously discussed. Once a set of the model prediction requests 305 has been processed against an ML model 135, ML model layer 150 may receive predictions 155 and then return prediction responses 124 to the appropriate user systems 120 or other requestors (e.g., an application server) that issued a prediction request 122. In some embodiments, ML model layer 150 may receive predictions 155 from hardware resources 160 as a batch. By batching multiple prediction requests 305 at once, those prediction requests 305 might be processed at relatively the same time and therefore multiple users/requestors may be served at the same time. This aspect of batching may provide an optimization to system 100 by increasing the speed at which prediction responses 124 are returned.

Figure 6:
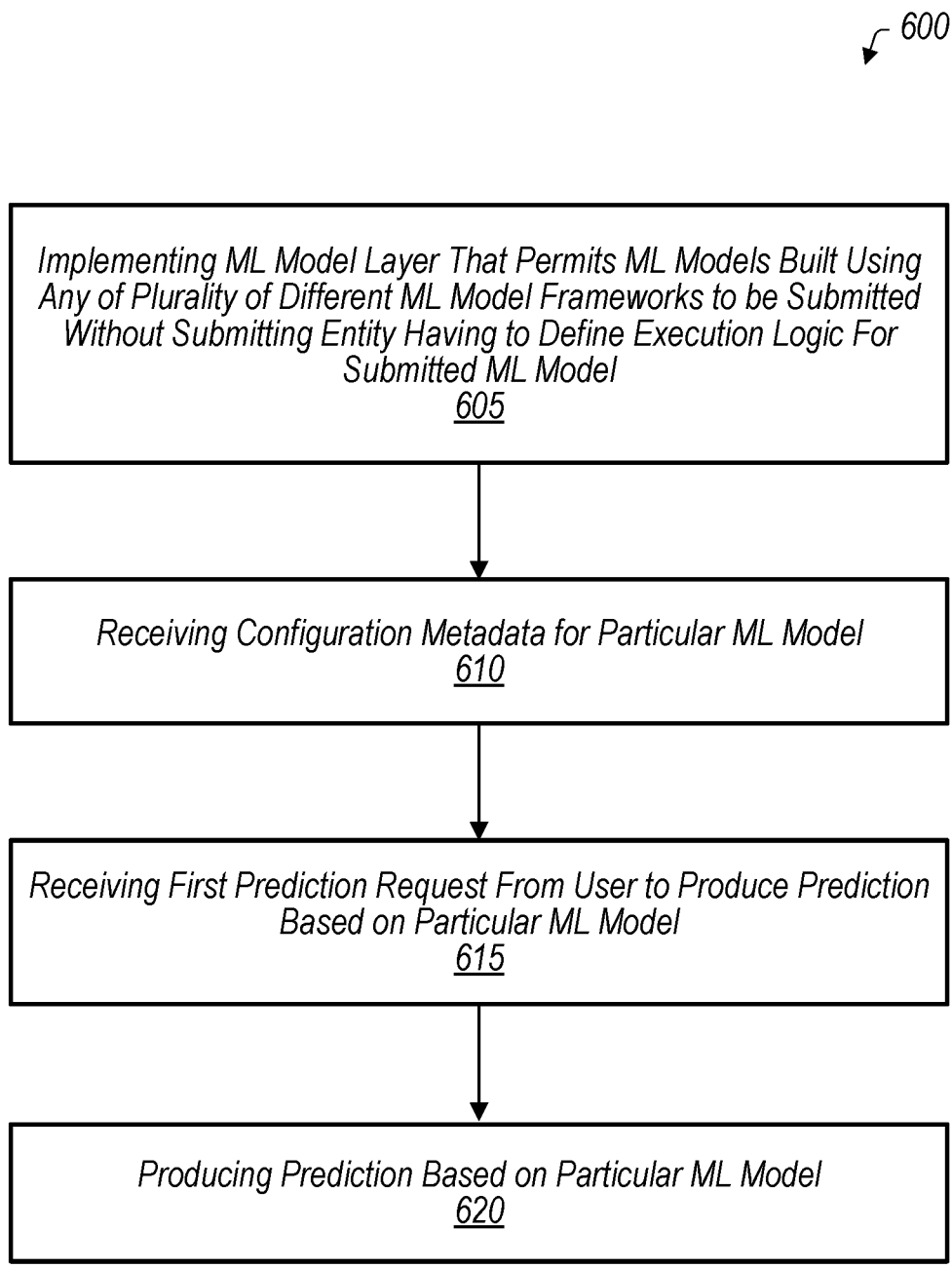
FIG. 6 is a flow diagram illustrating an example method relating to allowing for machine learning models to be used to produce prediction, according to some embodiments.

Turning now to FIG. 6, a flow diagram of a method 600 is shown. Method 600 is one embodiment of a method performed by a computer system (e.g., model execution system 110) to implement an ML model layer (e.g., ML model layer 150) that permits ML models (e.g., ML models 135) to be submitted without a submitting entity (e.g., a user of user system 120) having to define execution logic. Method 600 may be performed by executing a set of program instructions stored on a non-transitory computer-readable medium and may include more or less steps than shown. For example, the model execution system may download the ML model from a store (e.g., model store 130) that is separate from the model execution system.

Method 600 begins in step 605 with the computer system implementing an ML model layer that permits ML models built using any of a plurality of different frameworks (e.g., Sci-Kit Learn, PyTorch, etc.) to be submitted without defining the execution logic for the submitted model.

In step 610, the computer system receives configuration metadata (e.g., configuration metadata 145) for a particular ML model. That configuration metadata may specify an input type and an output type for the particular ML model and a maximum batch size indicating a maximum number of prediction requests that can be issued against the particular ML model at a time. The configuration metadata may also specify a location external to the computer system where the particular ML model is stored (e.g., model store 130). The configuration metadata may further identify a model execution platform capable of executing the particular ML model and a set of preferred batch sizes indicative of respective numbers of prediction requests that can be issued against the particular ML model at a time—the ML model may be optimized for these preferred batch sizes. In response to receiving the configuration metadata, the computer system may store the configuration metadata (e.g., at a different storage location than where the particular ML model is stored, such as metadata store 140).

In step 615, the computer system receives a first prediction request from a user (e.g., via a user system 120) to produce a prediction based on the particular ML model. In response to the prediction request, the computer system may access the configuration metadata using an identifier of the prediction request and then the particular ML model from the location external to the computer system.

In step 620, the computer system produces a prediction based on the particular ML model. The producing may include selecting one of a plurality of types of hardware resources (e.g., GPUs 312, CPUs 316, etc.) on which to load the particular ML model. The selecting may be based on the configuration metadata of the particular ML model and the selected type of hardware resource may be selected based on a model execution platform (capable of executing the particular ML model) being designed for the selected type of hardware resource. Further, as a part of producing the prediction, the computer system may pre-process an input of the first prediction request to ensure that the input satisfies the input type specified by the configuration metadata and post-process the prediction to ensure that the output satisfies the output type that is specified by the configuration metadata.

In some embodiments, the computer system maintains a set of ML models in a memory (e.g., system memory 410), including the particular ML model. As such, the computer system may load the particular ML model onto a hardware resource of the selected type of hardware resource from the memory. The loading may include swapping the particular ML model with another ML model already loaded on the hardware resource. The swapping may be performed in response to determining that a computing resource threshold associated with the hardware resource is already being consumed by ML models loaded on that hardware source (e.g., there is not enough memory for another ML model). The swapping may be based on a replacement policy (e.g., least recently used) and thus the computer system identify an ML model based on that replacement policy and then offload it. The model swap may also be performed in order to meet resource requirements specified in the configuration metadata. For example, if an ML model requires 8 GB of memory, then already allocated ML models can be deallocated until at least 8 GB of memory becomes available. In some embodiments, a plurality of instances of the particular ML model are loaded onto hardware resources of the selected type of hardware resource (e.g., three instances across three CPUs 316). The computer system may issue a batch of prediction requests against that plurality of instances.

In some cases, the computer system receives a second prediction request to produce a prediction based on the particular ML model. Accordingly, the computer system may produce another prediction based on the particular ML model without reloading the particular ML model on the selected type of hardware resource. In some cases, the second prediction request is received from a different user/entity than the user that provided the first prediction request.

Exemplary Computer System

Figure 7:
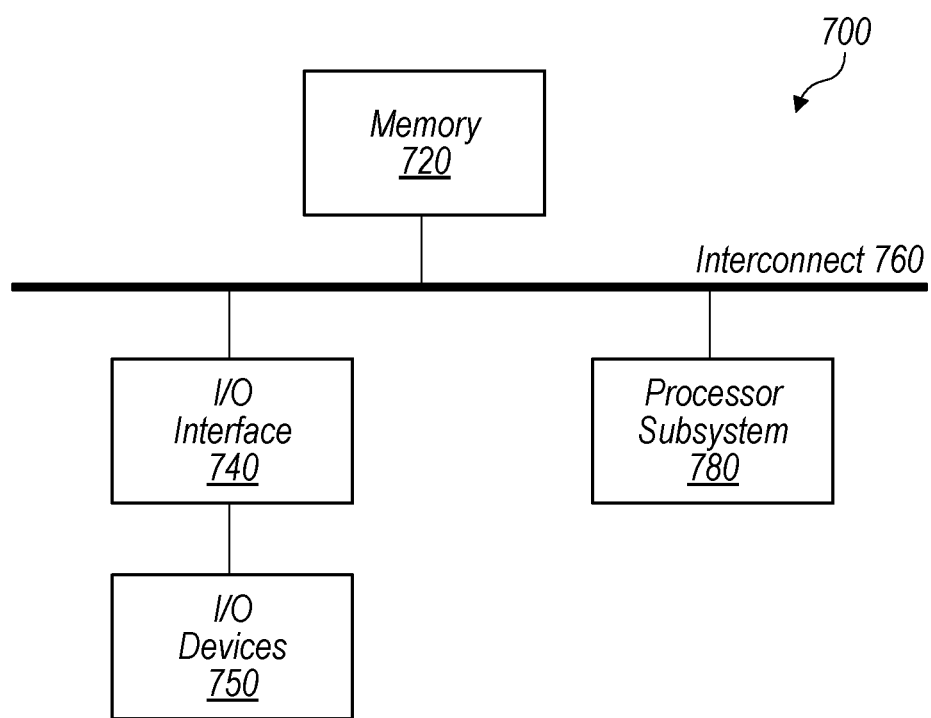
FIG. 7 is a block diagram illustrating elements of a computer system for implementing various systems described in the present disclosure, according to some embodiments.

Turning now to FIG. 7, a block diagram of an exemplary computer system 700, which may implement system 100, model execution system 110, and/or user system 120 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement model store 130, metadata store 140, and/or ML model layer 150 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   implementing, by a computer system, a machine learning (ML) model layer that permits ML models built using any of a plurality of different ML model frameworks to be submitted without a submitting entity having to define execution logic for a submitted ML model;
   receiving, by the computer system via the ML model layer, configuration metadata for a particular ML model, wherein the configuration metadata identifies a particular one of the plurality of different ML model frameworks that is associated with the particular ML model;
   receiving, by the computer system, a first prediction request from a user to produce a prediction based on the particular ML model, wherein the first prediction request identifies a model identifier of the particular ML model; and
   producing, by the computer system, a prediction based on the particular ML model, wherein the producing includes:
     accessing the configuration metadata using the model identifier;
     selecting, based on the particular ML model framework that is identified by the accessed configuration metadata, one of a plurality of types of hardware resources on which to load the particular ML model;
     loading the particular ML model from a storage onto a hardware resource of the selected type of hardware resource; and
     producing the prediction using a set of inputs from the first prediction request with the loaded, particular ML model.

2. The method of claim 1, wherein the method further comprises:
   receiving, by the computer system, a second prediction request to produce a prediction based on the particular ML model; and
   producing, by the computer system, another prediction based on the particular ML model without reloading the particular ML model on the selected type of hardware resource.

3. The method of claim 2, wherein the second prediction request is received from a different user than the user that provided the first prediction request.

4. The method of claim 1, wherein the configuration metadata specifies a maximum batch size that indicates a maximum number of prediction requests that can be issued against the particular ML model at a time.

5. The method of claim 1, further comprising:
   maintaining, by the computer system, a set of ML models in a memory of the computer system, wherein the set of ML models includes the particular ML model, wherein the loading includes swapping the particular ML model with another ML model already loaded on the hardware resource.

6. The method of claim 5, wherein the swapping is performed in response to determining that a computing resource threshold associated with the hardware resource is already being consumed by ML models loaded on the hardware resource.

7. The method of claim 1, wherein the configuration metadata specifies an input type and an output type for the particular ML model, and wherein the producing of the prediction using the set of inputs includes pre-processing on the set of inputs to ensure that the set of inputs satisfies the input type.

8. The method of claim 1, wherein the configuration metadata specifies a location external to the computer system where the particular ML model is stored, and wherein the method further comprises:

after accessing the configuration metadata, the computer system accessing, based on the configuration metadata, the particular ML model from the location external to the computer system.

9. The method of claim 8, wherein the configuration metadata is stored at a different storage location than the particular ML model.

10. A non-transitory computer-readable medium having program instructions stored thereon that are executable to cause a computer system to perform operations comprising:

implementing a machine learning (ML) model layer that permits ML models built using any of a plurality of different ML model frameworks to be submitted without a submitting entity having to define execution logic for a submitted ML model;

receiving, via the ML model layer, configuration metadata for a particular ML model, wherein the configuration metadata identifies a particular one of the plurality of different ML model frameworks that is associated with the particular ML model;

receiving a first prediction request to produce a prediction based on the particular ML model, wherein the first prediction request identifies a model identifier of the particular ML model; and producing a first prediction based on the particular ML model, wherein the producing includes:

accessing the configuration metadata using the model identifier;

selecting, based on the particular ML model framework that is identified by the accessed configuration metadata, one of a plurality of types of hardware resources on which to load the particular ML model;

loading the particular ML model from a storage onto a hardware resource of the selected type of hardware resource; and producing the prediction using a set of inputs from the first prediction request with the loaded, particular ML model.

11. The medium of claim 10, further comprising:

producing a second prediction based on the particular ML model without reallocating the particular ML model on the selected type of hardware resource, wherein the first prediction is produced for a first tenant of the computer system and the second prediction is produced for a second, different tenant of the computer system.

12. The medium of claim 10, wherein the operations further comprise:

loading a plurality of instances of the particular ML model onto hardware resources of the selected type of hardware resource; and issuing a batch of prediction requests, including the first prediction request, against the plurality of instances.

13. The medium of claim 10, wherein the loading includes:

identifying, based on a replacement policy, an ML model loaded on the hardware resource; and offloading the identified ML model from the hardware resource prior to loading the particular ML model onto the hardware resource.

14. The medium of claim 10, wherein the configuration metadata specifies a plurality of batch sizes indicative of respective numbers of prediction requests that can be issued against the particular ML model at a time.

15. A system, comprising:

at least one processor;

a memory having program instructions stored thereon that are executable by the at least one processor to cause the system to perform operations comprising:

implementing a machine learning (ML) model layer that permits ML models built using any of a plurality of different ML model frameworks to be submitted without a submitting entity having to define execution logic for a submitted ML model;

receiving, via the ML model layer, configuration metadata for a particular ML model, wherein the configuration metadata identifies a particular one of the plurality of different ML model frameworks that is associated with the particular ML model;

receiving a first prediction request from a user to produce a prediction based on the particular ML model, wherein the first prediction request identifies a model identifier of the particular ML model; and producing a prediction based on the particular ML model, wherein the producing includes:

accessing the configuration metadata using the model identifier;

selecting, based on the particular ML model framework that is identified by the accessed configuration metadata, one of a plurality of types of hardware resources on which to load the particular ML model;

loading the particular ML model from a storage onto a hardware resource of the selected type of hardware resource; and producing the prediction using a set of inputs from the first prediction request with the loaded, particular ML model.

16. The system of claim 15, wherein the operations further comprise:

accessing, based on the configuration metadata, the particular ML model from a location external to the system, wherein the particular ML model and configuration metadata are stored at different storage locations.

17. The system of claim 15, wherein the operations further comprise:

maintaining a set of ML models in the memory of the system, wherein the set of ML models includes the particular ML model; and wherein the loading includes swapping the particular ML model with another ML model already loaded on the hardware resource.

18. The system of claim 15, wherein the plurality of types of hardware resources includes at least a central processing unit and a graphics processing unit.

* * * * *